US007401095B2

(12) United States Patent
Chan et al.

(10) Patent No.: US 7,401,095 B2
(45) Date of Patent: Jul. 15, 2008

(54) METHOD AND SYSTEM FOR COMPOSING A QUERY FOR A DATABASE AND TRAVERSING THE DATABASE

(75) Inventors: Victor Chan, Thornhill (CA); Fen Wang, Toronto (CA); Mark W. Hubbard, Maple (CA)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 11/246,341

(22) Filed: Oct. 7, 2005

(65) Prior Publication Data

US 2006/0036594 A1 Feb. 16, 2006

(51) Int. Cl.
*G06F 17/00* (2006.01)

(52) U.S. Cl. .............................. 707/102; 707/3; 707/4; 707/104.1

(58) Field of Classification Search .................. 707/1–6, 707/10, 100–102, 203
See application file for complete search history.

(56) References Cited

U.S. PATENT DOCUMENTS

| | | | | | |
|---|---|---|---|---|---|
| 5,181,161 | A | * | 1/1993 | Hirose et al. ............. | 369/47.26 |
| 5,201,046 | A | * | 4/1993 | Goldberg et al. ............ | 707/100 |
| 5,295,261 | A | * | 3/1994 | Simonetti ...................... | 707/2 |
| 5,625,813 | A | * | 4/1997 | Venn ............................. | 707/2 |
| 5,671,404 | A | | 9/1997 | Lizee et al. | |
| 5,758,335 | A | * | 5/1998 | Gray ............................. | 707/2 |
| 5,884,304 | A | * | 3/1999 | Davis et al. ..................... | 707/4 |
| 5,930,795 | A | * | 7/1999 | Chen et al. .................. | 707/100 |
| 6,167,393 | A | * | 12/2000 | Davis et al. ..................... | 707/3 |
| 6,298,338 | B1 | * | 10/2001 | Melton et al. .................. | 707/2 |
| 6,374,252 | B1 | * | 4/2002 | Althoff et al. ............... | 707/102 |
| 6,421,663 | B1 | | 7/2002 | Chen et al. ..................... | 707/3 |
| 6,553,371 | B2 | | 4/2003 | Gutierrez-Rivas et al. ...... | 707/3 |
| 6,604,100 | B1 | | 8/2003 | Fernandez et al. ............. | 707/3 |
| 6,658,407 | B1 | * | 12/2003 | Bailey ........................... | 707/3 |
| 6,684,216 | B1 | * | 1/2004 | Duliba et al. ............... | 707/102 |
| 6,694,306 | B1 | | 2/2004 | Nishizawa et al. ............. | 707/3 |
| 6,754,653 | B2 | | 6/2004 | Bonner et al. .................. | 707/4 |
| 6,985,899 | B2 | * | 1/2006 | Chan et al. ..................... | 707/6 |
| 2003/0110467 | A1 | | 6/2003 | Balakrishnan .............. | 717/104 |

FOREIGN PATENT DOCUMENTS

EP 575358 12/1993
JP 11328199 A2 11/1999

* cited by examiner

*Primary Examiner*—Christian P. Chace
*Assistant Examiner*—Jacques Veillard
(74) *Attorney, Agent, or Firm*—Sawyer Law Group LLP

(57) ABSTRACT

A system and method of composing a query object for application against a database is provided. The method composes a selection clause for the query. Next, a criteria clause for the query is generated, with the criteria clause comprising input criteria related to the query, additional criteria specified against the query, and generated criteria based on a joint relationship. Next a source clause utilizing elements in the database accessed by the query is generated. A database traversal system and method is provided. The method identifies all tables directly accessible by each table and creates a data structure comprising an entry for each table. The entry comprises an identification field for each table and a link field identifying all tables directly accessible by each table. The data structure is traversed and an optimum path of the traversal paths utilizing data obtained from traversing the data structure is identified.

8 Claims, 16 Drawing Sheets

Search Criteria
Fill in at least one field. Fill more to narrow your search.
Need high speed? Try Fast Search.

500

Figure 6  Rose Diagram

Figure 8

```
        // construct the simple search conditions
        Attribute attr1 = new Attribute (CatRefIdAttributeInfo, Operator.equal, "123");
        Attribute attr2 = new Attribute (ColourttributeInfo, Operator.equal, "red");
802     Attribute attr3 = new Attribute (ManufatureAttributeInfo, Operator.equal, "Sears");
        Attribute attr4 = new
        Attribute(CatRefIdAttributeInfo,Operator.equal,DescRefIdAttributeInfo,);

// compose composite search conditions
        Predicate p1 = new Predicate (Operator.and, {attr1, attr2} );
804     Predicate p2 = new Predicate (Operator.and, {p1, attr3, attr4} );

// execute the query
806     Query q = new Query ()
        q.setResultSet ({ CatRefIdAttributeInfo, ... }) // result set contains catalog entryId
        q.setPredicate (p2);
808     result = q.execute ()
```

```
public void MCQuery()   throws Exception {

Debug.setLocalTest(true);

System.out.println("**************** Merchant Centre *******************");
```

900   CatalogQuery MCQuery = new CatalogQuery();   901

```
// Result set
MCQuery.addResultSetInfo(new Result(CatEntryIdentifierAttributeInfo.getSingleton()()));
MCQuery.addResultSetInfo(new Result(StoreInvQuantityAttributeInfo.getSingleton()()));
```
902   `MCQuery.addResultSetInfo(new Result(CatEntDescShortDescAttributeInfo.getSingleton()));`
```
MCQuery.addResultSetInfo(new Result(CatEntDescNameAttributeInfo.getSingleton()));
MCQuery.addResultSetInfo(new Result(CatEntryTypeAttributeInfo.getSingleton()));
MCQuery.setDistinctQualifier(true);
```

```
         // Predicate set
         // Part I
         Predicate p11 = new Predicate ();          908a
         p11.setOperator (Operator.or);
         Attribute a111 = new Attribute (CatGrpDescNameAttributeInfo.getSingleton(), Operator.leftlike,
         "CATEGORY X");
         a111.setUppercaseQualifier(true);
910a     p11.addOperand (a111);
         Attribute a112 = new Attribute (CatGrpDescNameAttributeInfo.getSingleton(), Operator.leftlike,
         "CATEGORY10");
         a112.setUppercaseQualifier(true);
         p11.addOperand (a112);

Predicate p12 = new Predicate ();          908a
         p12.setOperator (Operator.and);
         p12.addOperand (new Attribute (ListPriceAttributeInfo.getSingleton(), Operator.gt, "0.0"));
910a     p12.addOperand (new Attribute (StoreInvQuantityAttributeInfo.getSingleton(), Operator.gt, "0.0"));
         p12.addOperand (new Attribute (InventoryQuantityMeasureAttributeInfo.getSingleton(), Operator.isnull));
         p12.addOperand (p11);

Predicate p13 = new Predicate ();          908a
         p13.setOperator (Operator.and);
         p13.addOperand (new Attribute (ListPriceAttributeInfo.getSingleton(), Operator.gt, "0.0"));
         p13.addOperand (new Attribute (StoreInvQuantityAttributeInfo getSingleton(), Operator.gt, "0.0"));
         p13.addOperand (new Attribute (InventoryQuantityMeasureAttributeInfo.get Singleton(),Operator.isnull));
910a     Attribute a13 = new Attribute (CatGrpDescNameAttributeInfo.getSingleton(), Operator.leftlike,
         "CATEGORY5");
         a13.setUppercaseQualifier(true);
         p13.addOperand (a13);

Predicate p14 = new Predicate ();          908a
         p14.setOperator (Operator.or);
910a     p14.addOperand (p12);
         p14.addOperand (p13);
```

Figure 9A(iii)

```
// Part II
        Predicate p21 = new Predicate ();           908b
        p21.setOperator (Operator.or);
        Attribute a211 = new Attribute (CatGrpDescNameAttributeInfo.getSingleton (), Operator.leftlike,
        "CATEGORY Z");
        a211.setUppercaseQualifier(true);
910b    p21.addOperand (a211);
        Attribute a212 = new Attribute (CatGrpDescNameAttributeInfo.getSingleton (),Operator.leftlike,
        "CATEGORY9");
        a212.setUppercaseQualifier(true);
        p21.addOperand (a212);

Predicate p22 = new Predicate ();           908b
        p22.setOperator (Operator.and);
        p22.addOperand (new Attribute (ListPriceAttributeInfo.getSingleton(), Operator.gt, "0.0"));
910b    p22.addOperand (new Attribute (StoreInvQuantityAttributeInfo.getSingleton(), Operator.gt, "0.0"));
        p22.addOperand (new Attribute (InventoryQuantityMeasureAttributeInfo.get Singleton(),Operator.isnull));
        p22.addOperand (p21);

Predicate p23 = new Predicate ();           908b
        p23.setOperator (Operator.and);
        p23.addOperand (new Attribute (ListPriceAttributeInfo.getSingleton(), Operator.gt, "0.0"));
        p23.addOperand (new Attribute (StoreInvQuantityAttributeInfo.getSingleton(), Operator.gt, "0.0")) ;
        p23.addOperand (new Attribute (InventoryQuantityMeasureAttributeInfo.get Singleton(),Operator.isnull));
910b    Attribute a23 = new Attribute (CatGrpDescNameAttributeInfo.getSingleton(), Operator.leftlike,
        "CATEGORY4");
        a23.setUppercaseQualifier(true);
        p23.addOperand (a23);

Predicate p24 = new Predicate ();           908b
        p24.setOperator (Operator.or);
        p24.addOperand (p22);
910b    p24.addOperand (p23);
        p24.setNotQualifier(true);
        System.out.println(p24.toString());
```

Figure 9A(iv)

```
// Part IV - Join
Predicate p4 = new Predicate ();      912
p4.setOperator (Operator.and);
p4.addOperand (p14);
p4.addOperand (p24);
p4.addOperand (new Attribute (StoreCEntStoreIdentifierAttributeInfo.getSingleton(), 914
Operator.eq, "2"));
p4.addOperand (new Attribute (UsersIdentifierAttributeInfo.getSingleton(), Operator.eq,
"1001"));
//p4.addOperand (p33);

MCQuery.setPredicate(p4);      916

// Join
System.out.println("Auto Join : ");
MCQuery.printJointRelationships();

// Resolve source tables
MCQuery.resolveSourceTables();      918

// ORDER, GROUP and HAVING set
MCQuery.addResultOrder(CatEntryIdentifierAttributeInfo.getSingleton(),
Operator.desc);      920

System.out.println("MC Query : ");
System.out.println(MCQuery.toString());

com.ibm.commerce.base.objects.Cursor cursor = new
com.ibm.commerce.base.objects.Cursor();
java.util.Vector v = MCQuery.execute(cursor);      922
System.out.println("MC Query first 10 Result: ")
System.out.println(v);
cursor.increment();
v = MCQuery.execute(cursor);      922
System.out.println("MC Query next 10 Result: ");
System.out.println(v);

```
public void setPredicate(Predicate aPredicate) throws Exception {

Predicate additionalP = additionalPredicate();   924
  if (additionalP != null) {
    Predicate p = new Predicate();
    p.setOperator(Operator.and);
    p.addOperand(aPredicate);
    p.addOperand(additionalP);
    setTableJointPredicate(p);
  }
  else
    setTableJointPredicate(aPredicate);
} private void setTablejointPredicate(Predicate aPredicate) throws Exception {

Predicate jointP = resolveJointPredicate(aPredicate);
  if (jointP != null) {
    Predicate p = new Predicate();
    p.setOperator(Operator.and);
    p.addOperand(aPredicate);
    p.addOperand(jointP);
    super.setPredicate(p);
  }                                              930
  else
    super.setPredicate(aPredicate);
}
```

926 (left of p.addOperand(aPredicate); in first block)

METHOD AND SYSTEM FOR COMPOSING A QUERY FOR A DATABASE AND TRAVERSING THE DATABASE

CROSS-REFERENCE TO RELATED APPLICATIONS

This application claims benefit under 35 USC 119 of Canadian Application 2,327,167 filed on Nov. 30, 2000.

FIELD OF THE INVENTION

The present invention relates to systems and methods for generating and traversing database query structures, in particular systems and methods for efficient organization and compiling of SQL queries.

BACKGROUND OF THE INVENTION

A database management system (DBMS) comprises a computer, data storage devices, disk drives and database management software. A relational database management system (RDBMS) is a DBMS which uses relational techniques for storing and retrieving information. The relational database management system comprises computerized information storage and retrieval systems in which data is stored on disk drives. The data is stored in the form of tables which comprise rows and columns. Each row, or tuple, has one or more columns.

The RDBMS is designed to accept commands to store, retrieve, and delete data. A well-known set of commands is based on the Structured Query Language or SQL. The term query refers to a set of commands in SQL for retrieving data from the RDBMS. The constructs of SQL allow a RDBMS to provide a response to a particular query with a particular set of data given a specified database content. SQL however does not specify the actual method to find the requested information in the tables on the disk drives. The method in which the query is processed, i.e. query execution plan, affects the overall time for retrieving the data. Data retrieval time may be critical to the operation of the database. Decreasing such retrieval time minimizes the computer and disk access time, and therefore, optimizes the cost of doing the query.

Accordingly, there is a need for a dynamic and efficient method and system for generating database queries.

SUMMARY OF THE INVENTION

In a first aspect, the invention provides a method of composing a dynamic query for application against a database. First, the method composes a selection clause for the query, with the selection clause comprising a results set related to the query. Next, the method composes a criteria clause for the query, with the criteria clause comprising input criteria related to the query and additional criteria specified against the query. Next the method composes a source clause utilizing elements in the database accessed by the query.

The method may compose an ordering scheme for results of the query.

The method may compose a grouping scheme for results of the query.

The method may compose the criteria clause by resolving joint relationships amongst the input criteria and the additional criteria.

The method may compose the criteria clause by adding the joint relationships to the criteria clause. Further, the method may compose the source clause by resolving a source after analyzing the selection clause and the criteria clause. The method may compose the query in SQL format. The method may apply the query against the database and results of the query may be provided to an output device.

In a second aspect, a query transaction system is provided. The query transaction system comprises a computer, access to a database associated with the computer and a query processing program operating on the computer and generating a query for the database. The query processing program has a selection clause composing module for the query, the selection clause module producing a results set related to the query. The program also has a criteria clause composing module for the query, the criteria clause module processing input criteria related to the query and additional criteria specified against the query. The program also has a source clause composing module utilizing elements in the database identified by the query.

The query processing program may further comprise an ordering module for results of the query.

The query processing program may further comprise a grouping module for results of the query.

For the criteria clause composing module of the query processing program, the module may have a joint relationships resolving module associating the input criteria to the additional criteria. Further, the criteria clause composing module may comprise a module adding the joint relationships to the criteria clause. Also, the source clause composing module may resolve the source after analyzing the selection clause and the criteria clause.

In another aspect, an article is provided. The article comprises a computer readable information storage medium and a computer readable program encoded on the medium. The program comprising a method of composing a query for application against a database. The method comprises composing a selection clause for the query, the selection clause comprising a results set related to the query, composing a criteria clause for the query, the criteria clause comprising input criteria related to the query and additional criteria specified against the query, and composing a source clause utilizing elements in the database identified by the query.

The method of the computer program may compose an ordering scheme for results of the query.

The method of the computer program may compose a grouping scheme for results of the query.

The method of the computer program may compose the criteria clause by resolving joint relationships amongst the input criteria and the additional criteria. The method may further compose the criteria clause by adding the joint relationships to the criteria clause. The method may also compose the source clause by resolving a source related to the database after analyzing the selection clause and the criteria clause. The method may also apply the query against the database and provided results of the query to an output device.

In another aspect, an article is provided. The article comprises a computer readable modulated carrier signal and a computer readable program encoded on the carrier signal. The program comprises a method of composing a query for application against a database. The method comprises composing a selection clause for the query, the selection clause comprising a results set related to the query, composing a criteria clause for the query, the criteria clause comprising input criteria related to the query and additional criteria specified against the query and composing a source clause utilizing elements in the database identified by the query.

For the article, the program encoded on the signal may compose an ordering scheme for results of the query.

For the article, the program encoded on the signal may compose a grouping scheme for results of the query.

For the article, the program encoded on the signal may compose the criteria clause by resolving joint relationships amongst the input criteria and the additional criteria.

For the article, the program encoded on the signal may compose the criteria clause by adding the joint relationships to the criteria clause. The program may compose the source clause by resolving a source related to the database after analyzing the selection clause and the criteria clause.

In yet another aspect, a method for evaluating traversal paths amongst tables in a database is provided. The database has at least a first and a second table. The method comprises, first, for each table, identifying all tables directly accessible by each table and creating a data structure having an entry for each table. The entry comprises an identification field for each table and a link field identifying the all tables directly accessible by each table. Next, for each entry in the data structure, the method traverses the data structure to visit all other entries in the data structure, if possible, using contents of the link field of each entry. Next, the method identifies an optimum path of the traversal paths utilizing data obtained from traversing entries in the data structure.

The method may track the number of hops taken to visit the all other entries for all possible traversal route to the all other entries. The method may have the data structure as a linked list. The method may traverse the data structure in a breadth first manner. Alternatively, the method may traverse the data structure in a depth first manner. The method may identify the optimum path utilizing the number of hops taken to visit the all other entries. The method may have the data structure further comprising a second link field identifying tables which directly access each table. The method may provide the optimum path to an output device.

In yet another aspect, a database analysis system is provided. The system comprises a computer, access to a database associated with the computer, the database comprising at least a first table and a second table, and a database traversal program associated with the computer. The traversal program evaluates traversal paths between the first table and the second table. The traversal program has a method which, first, for each table of the plurality of tables, identifies all tables directly accessible by each table and creates a data structure comprising an entry for each table. The entry comprises an identification field for each table and a link field identifying the all tables directly accessible by each table. Next, for each entry in the data structure, the method traverses the data structure to visit all other entries in the data structure, if possible, using contents of the link field of each entry. Next, the method identifies an optimum path of the traversal paths utilizing data obtained from traversing entries in the data structure.

In yet another aspect, an article is provided comprising a computer readable instruction storage medium, a database traversal program encoded on the medium. The program evaluates traversal paths in a database. The database comprises at least a first table and a second table. The database traversal program has a method embodied therein. The method comprises, first, for each table of the plurality of tables identifying all tables directly accessible by each table and creating a data structure comprising an entry for each table, the entry comprising an identification field for each table and a link field identifying the all tables directly accessible by each table. Next, for each entry in the data structure, the method traverses the data structure to visit all other entries in the data structure, if possible, using contents of the link field of each entry. Next the method identifies an optimum path of the traversal paths utilizing data obtained from traversing entries in the data structure.

In other aspects of the invention, various combinations and subsets of the aspects described above are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 8 is a listing code implementing the algorithm of FIG. 5;

FIG. 9A(i) is a listing of pseudocode associated with a portion of a query building module associated with the algorithm of FIG. 5;

FIG. 9A(ii) is a continuation of a listing of pseudocode associated with a portion of the query building module of FIG. 9A(i);

FIG. 9A(iii) is a continuation of a listing of pseudocode associated with a portion of the query building module of FIG. 9A(ii);

FIG. 9A(iv) is a continuation of a listing of pseudocode associated with a portion of the query building module of FIG. 9A(iii);

FIG. 9B is a listing of more pseudocode associated with a smart query associated with the algorithm of FIG. 5;

DETAILED DESCRIPTION OF THE PREFERRED EMBODIMENTS

Figure 1:
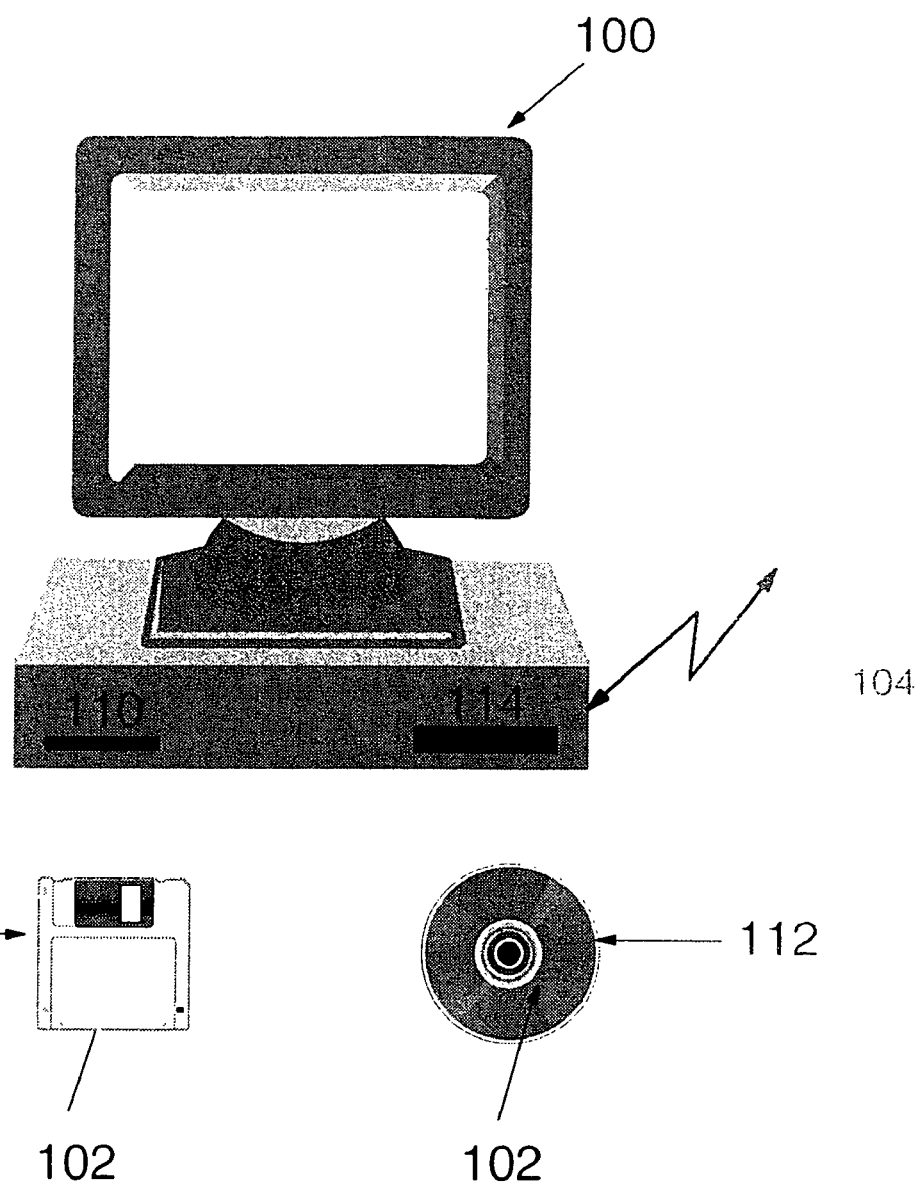
FIG. 1 is the block diagram of a computer accessing a database system utilizing an embodiment of the invention.

The description which follows, and the embodiments described therein, are provided by way of illustrating an example, or examples, of particular embodiments of principles of the present invention. These examples are provided for the purpose of explanation, and not limitation, of those principles and of the invention. In the description which follows, like elements are marked throughout the specification and the drawings with the same respective reference numerals.

Referring to FIG. 1, computer 100 has software 102 operating thereon allowing queries to be made to database 104 which is accessible by computer 100. Database 104 is accessible either internally or externally via computer 100. Database 104 may be a relational database. Queries to database 104 may be in Structured Query Language (SQL). Display 106 provides a visual interface for the user of computer 100 when accessing software 102. Software 102 causes user prompts and search results of queries to database 104 to be shown on display 106. Data and queries may be entered to software 102 via keyboard 107 on computer 100.

Software 102 may be encoded on disk 108. Disk 108 may be inserted into computer 100 via disk drive 110 to allow computer 100 to load software 102 into its memory. Alternatively, software 102 may be embodied onto CD-ROM 112 in an appropriate computer readable code, which may load its contents into computer 110 via CD-ROM drive 114. It will be appreciated that other medium and mechanisms may be used to load software 102 on to computer 100 including remote downloads wherein the software 102 is transmitted to computer 100 from a remote computer utilizing a modulated carrier signal.

Figure 2:
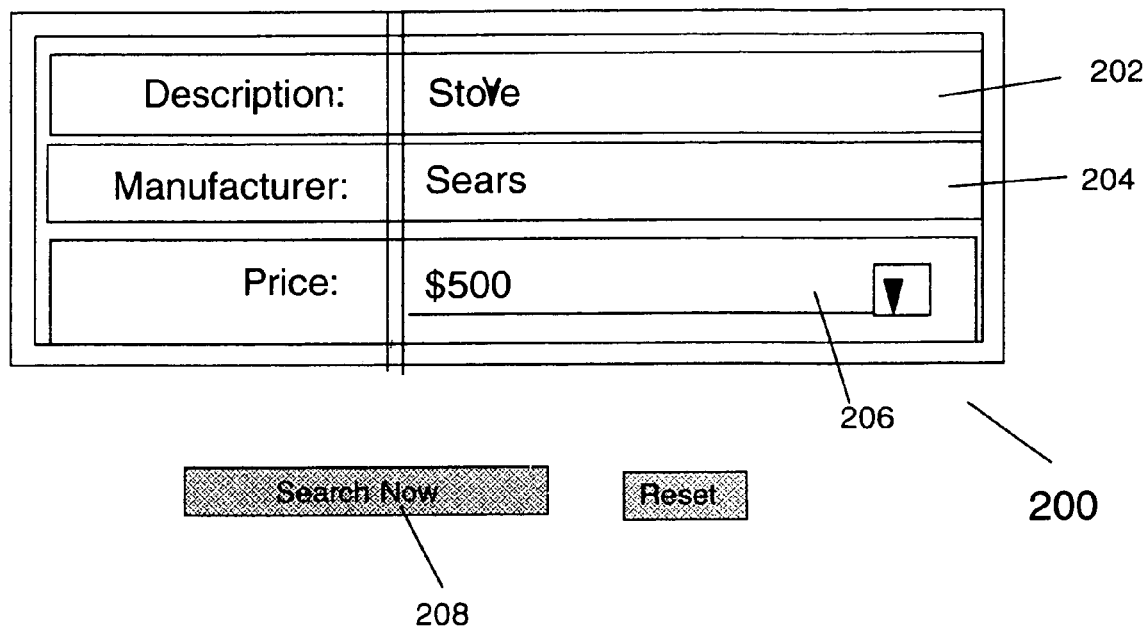
FIG. 2 is an exemplary screen shot of software operating on a computer of a search field accessing a database of FIG. 1.

Referring to FIG. 2, screen shot 200 shows a typical query screen generated by software 102 and shown on display 106 for accessing database 104. The query screen 200 has fields into which a user enters values to compose a query which will be executed against database 104. For example, in the preferred embodiment, the fields include description field 202, manufacturer field 204 and a drop-down menu for price field 206. Using computer 100, the user enters values for the fields of, e.g. "stove" in field 202, "Sears" in field 204, then selects a price from field 206, e.g. "$500". The user then activates the "Search Now" button 208 which causes software 102 to generate an appropriate SQL query for "stoves" from "Sears" which cost "$500" and apply it against database 104. The results of the query are then provided to the user or the system. The results may be provided on display 106, to a printer (not shown), to a disk in a written format, to another database, to another computer or to any output device known in the art.

Figure 3:
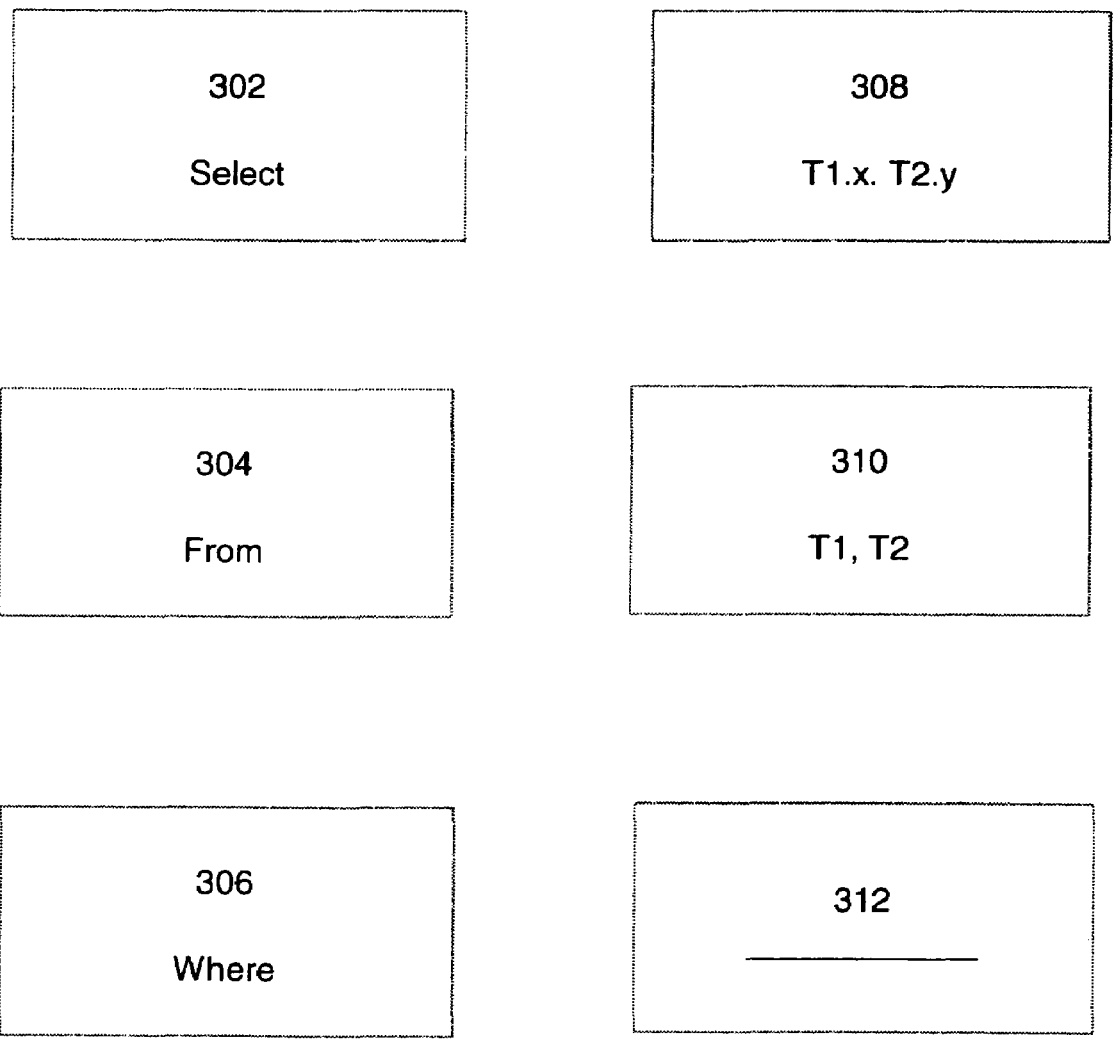
FIG. 3 is a block diagram of a query structure used to access the database system of FIG. 1.

Referring to FIG. 3, an SQL query generated by software 102 from the criteria entered by the user is shown in query syntax 300. Query syntax 300 comprises "select" clause 302, "from" clause 304 and "where" clause 306. "Select" clause 302 identifies the table columns of database 104 from which the response to the query is generated. "From" clause 304 identifies the tables from which the query will generate its response. "Where" clause 306 identifies specific items 312 from the tables for which the user provided specific search criteria. Relating the contents of clauses 302, 304 and 306 to query screen 200, parameters in field 308 identify the description field 202 and manufacturer field 204. Parameter 310 identifies the tables in which description field and manufacturer field information are stored in database 104; parameters in field 312 identify queries relating to description field 202, manufacturers field 204 and price field 206.

Figure 4:
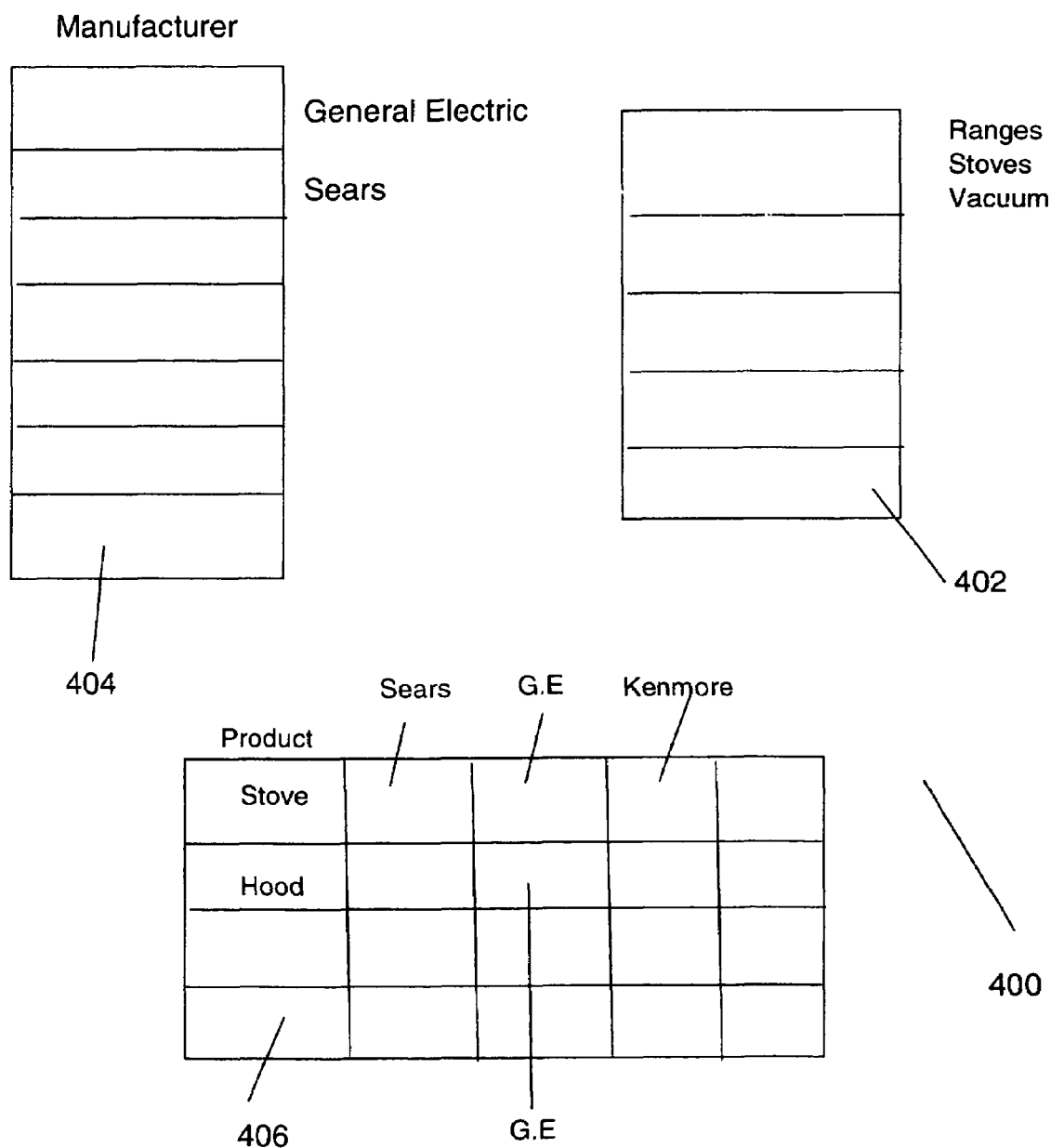
FIG. 4 is an exemplary set of tables representing data stored in the database system of FIG. 1.

Referring to FIG. 4, a representative series of tables 400 relating to database 104 are shown. In particular, table 402 contains a row listing items contained in the database 102. Table 404 contains a row listing manufacturers to products and table 406 is a table of products to manufacturers.

Figure 5:
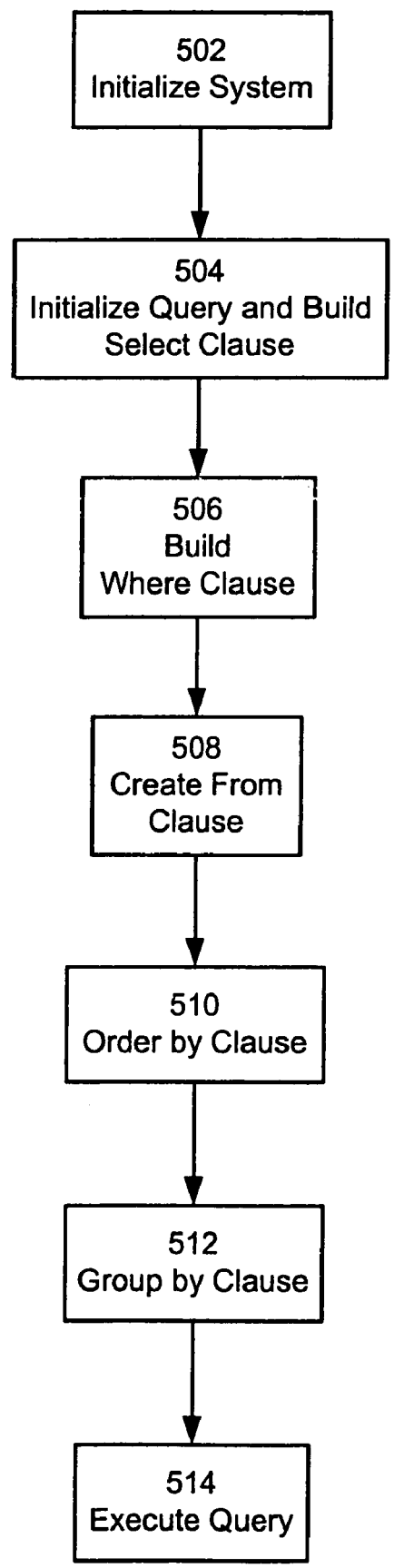
FIG. 5 is a flow diagram of an algorithm of the embodiment of the database system of FIG. 1.

Referring to FIG. 5, algorithm 500 provides a flow chart for software 102 of the main functional aspects of the embodiment which processes database requests, such as a request generated from screen shot 200 (FIG. 2), to generate SQL queries, such as SQL query 300 (FIG. 3). First, software 102 is initialized at step 502. Initialization may include aspects such as turning on the computer 100, initializing the access to appropriate databases and loading appropriate software to and from appropriate computers. Next, step 504 initializes query. In this step, a new query is defined, appropriate resources are allocated to it and a "select" clause is built.

In step 506 the "where" clause 306 (FIG. 3) is built by creating a predicate based on the user specified search criteria. Next, additional predicates are added to the predicate. For example, if there are any common search criteria, they may be provided as an additional predicate and appended to the query as hard-coded operands. Utilizing additional set predicates enables a query to be built without having to identify repeatedly common query elements for each query. Accordingly, such hard-coded operands enable the query to be executed faster without parsing additional elements of the query.

Also in step 506, joint predicates are resolved from the user inputs and any common predicates. In the embodiment all table relationships, either direct or indirect, are stored in a predetermined file, built from a predetermined XML file. The file contains a relationship dictionary which is searched by software 102 to ascertain relationships existing amongst tables. The file is parsed and a dictionary of table links is generated. For example, for Tables A, B and C, Table A and Table B may be linked through Table C via the relationship TableA.col1=TableC.col2 and TableC.col3=TableB.col4. The dictionary entry will have a key of "TableA & TableB" and its associated element would be "TableA.col1=TableC.col2 and TableC.col3=TableB.col4." It can be appreciated that such table relationships may be provided through a separate database catalogue. Next, joint predicates are added to the predicates to create the "where" clause 306.

Next, "from" clause 304 is created in step 508. Therein, source tables are resolved in the "from" clause 304 using explicit instructions from the user and implicit information from the source tables in the "select" clause 302 and "where" clause 306.

Grouping and ordering of the clauses are performed in steps 510 and 512 and the query statement is executed in step 514.

Figure 6:
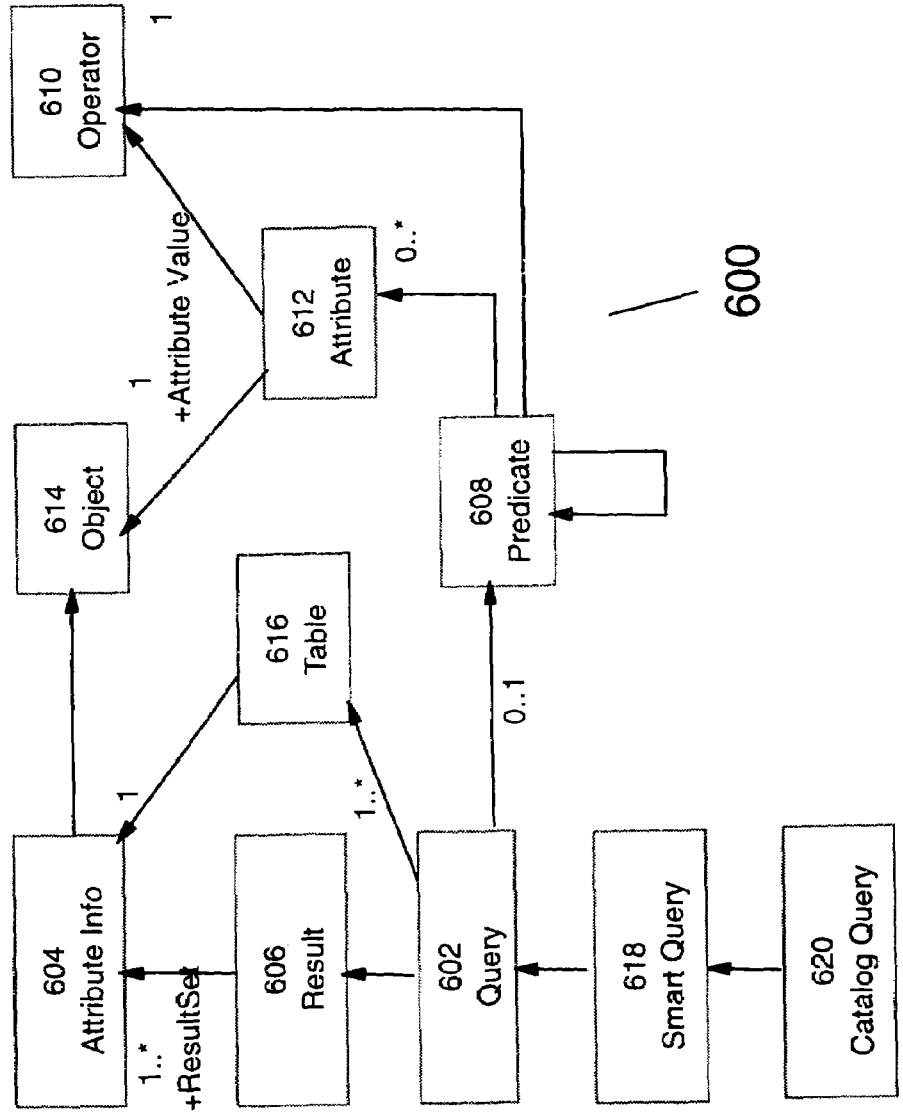
FIG. 6 is a block diagram of relationship aspects of table elements in the database system of FIG. 1.

Referring to FIG. 6, Rose diagram 600 illustrates aspects of SQL statements modelled by objects used by the embodiment. Rose diagram 600 comprises a series of objects showing interrelationships amongst objects by arrows. Each arrow relates child object (source) to a parent object (destination). A number associated with the head of the arrow indicates the number of parents associated with each child. Using an object oriented design for modelling a SQL statement, components for the SQL statement can be dynamically created and manipulated as objects.

In particular, query object 602 is the central query object interface for the embodiment. It contains one or more Attribute Info Objects 604. Result object 606 contains data retrieved by executing the query. Predicate object 608 may be related in a zero-to-one relationship to query object 602. Predicate object 608 models the complex conditions for the related SQL statement. Operator object 610 has a one-to-one association with predicate object 608. Operator object 610 assigns an attribute value to an attribute 612. Attribute object 612 models a searchable attribute. It is created from AttributeInfo object 604. AttributeInfo 604 is an object containing the metadata of each column in the database table.

For each SQL statement, attribute object 612 contains an operator object 610 and an attribute value object 614. Table object 616 is associated with query object 602, in a one-to-many relationship. Smart query object 618 is associated with query 602 as a child. Catalogue query object 620 is associated with smart query object 618 as a child. Both smart query object 618 and catalogue query 620 are appended to query 602 using elements of the embodiment in order to streamline operation and execution of query 602. Further detail on the operation of Smart Query object is provided later.

Figure 7:
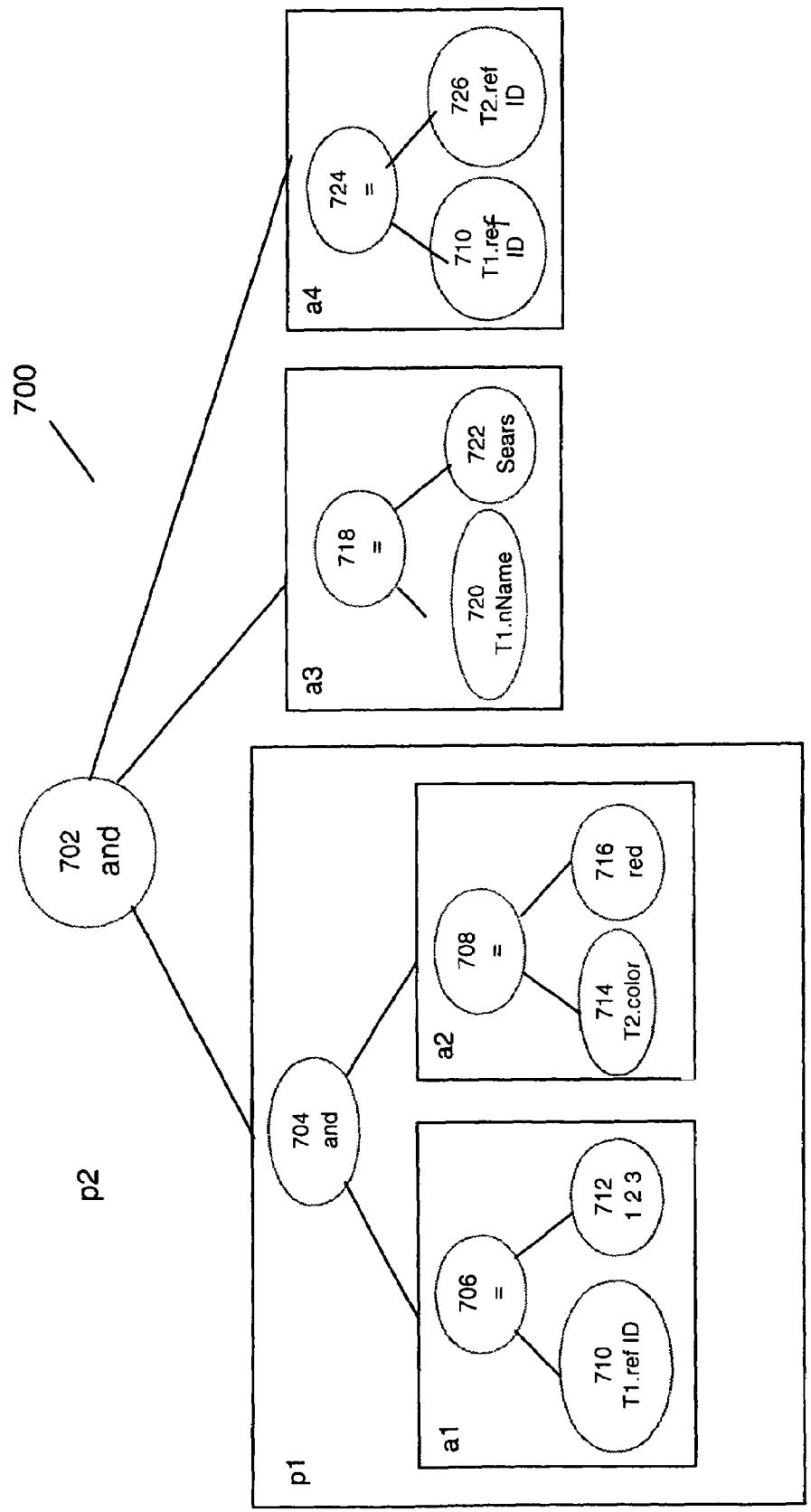
FIG. 7 is a block diagram of a data structure generated by the embodiment of FIG. 1.

Referring to FIG. 7, relationships associated with predicate object 608 may be used to dynamically compose a query tree 700 for the following SQL query in Example 1:

EXAMPLE 1

Select T1.referenceNumber, T2.colour
from CatalogueEntry T1, AttributeValue T2
where (T1.refId="123" and T2.colour="red") and (T1.Name="Sears") and (T1.refId=T2.refId)

There are two predicates with the query, namely predicate 702 and predicate 704 which both comprise an AND operator. Predicate 704 operates on attribute 706 and attribute 708. Attribute 708 associates the catalogue reference ID field of Table 1 ("T1") with the value of "123". Attribute 708 associates the Colour Attribute Info of Table 2 ("T2") with colour "red". These tables and values are represented by elements 710, 712, 714, and 716, respectively. Attribute 718 equates the nName field of T1, represented by attribute 720, with a value of "Sears", represented by the value 722. Attribute 724 equates the T1.refId field 710 with T2.refId field 726. Predicate 702 operates on predicate 704, attribute 718 and attribute 724.

Referring to FIG. 8, the embodiment traverses the query tree and constructs code 800 which embodies the SQL query of Example 1. First, code 802 constructs simple attribute conditions. Next, composite search conditions, using predicates, are constructed through code at 804. Finally, the query is executed through code at 806 and results are returned through code at 808.

Details of the pseudo code underlying the creation of appropriate data structures for code 800 are now provided.

Referring to FIG. 9A(i) and FIG. 5, aspects of pseudocode for algorithm 500 used to build a results set are shown. First, per step 504, pseudocode in section 900 defines a results set information object 901 for the query. Code in 902 builds a "select" clause for the query by consecutively adding AttributeInfo objects 904 into the results set information object 901.

Referring to FIG. 9A(ii), 9A(iii) and FIG. 5, the first part of a "where" clause is built per step 506. A series of two parts for a predicate set are built in sections 906a, and 906b. For each predicate, an operator is defined at 908a and 908b, then a series of operands are added per sections 910a and 910b.

Referring to FIG. 9A(iv) and FIG. 5, the remaining part of the "where" clause is built. Code 912 creates an object for the joint predicates associated with the query. Code at 914 adds the joint relationships to the existing predicates. Finally, Set-Predicate code 916 adds the smart query and the catalog query predicates to the existing predicates.

Next, for step 508, code 918 resolves the source tables for the query. Ordering and grouping of predicates by clause (steps 510 and 512) are performed by code 920. Finally, the query is executed for step 514 using code 922.

Referring to FIG. 9B, further detail is provided for the smart query predicate. First, a test is conducted to determine whether any hard coded predicates are to be added, per line 924. If hard coded predicates exist, they are added to the existing predicate per the code at 926.

If hard coded predicates do not exist, then joint table predicates are resolved through code at 928, embodied specifically in code 930. The joint predicates provide information on how tables are related to each other. These relationships are required to conduct a search based on multiple tables on a relational database since some information can expand several tables.

Another aspect of the embodiment provides a system and method of evaluating the number of hops between tables when determining links amongst elements in tables when queries are executed.

As noted earlier, when executing a query, multiple tables are often associated with it. Accordingly table joint conditions must be specified amongst the tables. There are two types of table joints: (i) a direct foreign key relationship, where a column in table A is a foreign key to table B; and (ii) an indirect foreign key relationship, where the foreign key relationships are described in separate tables and the relationships may involve several indirect tables.

Figure 10:
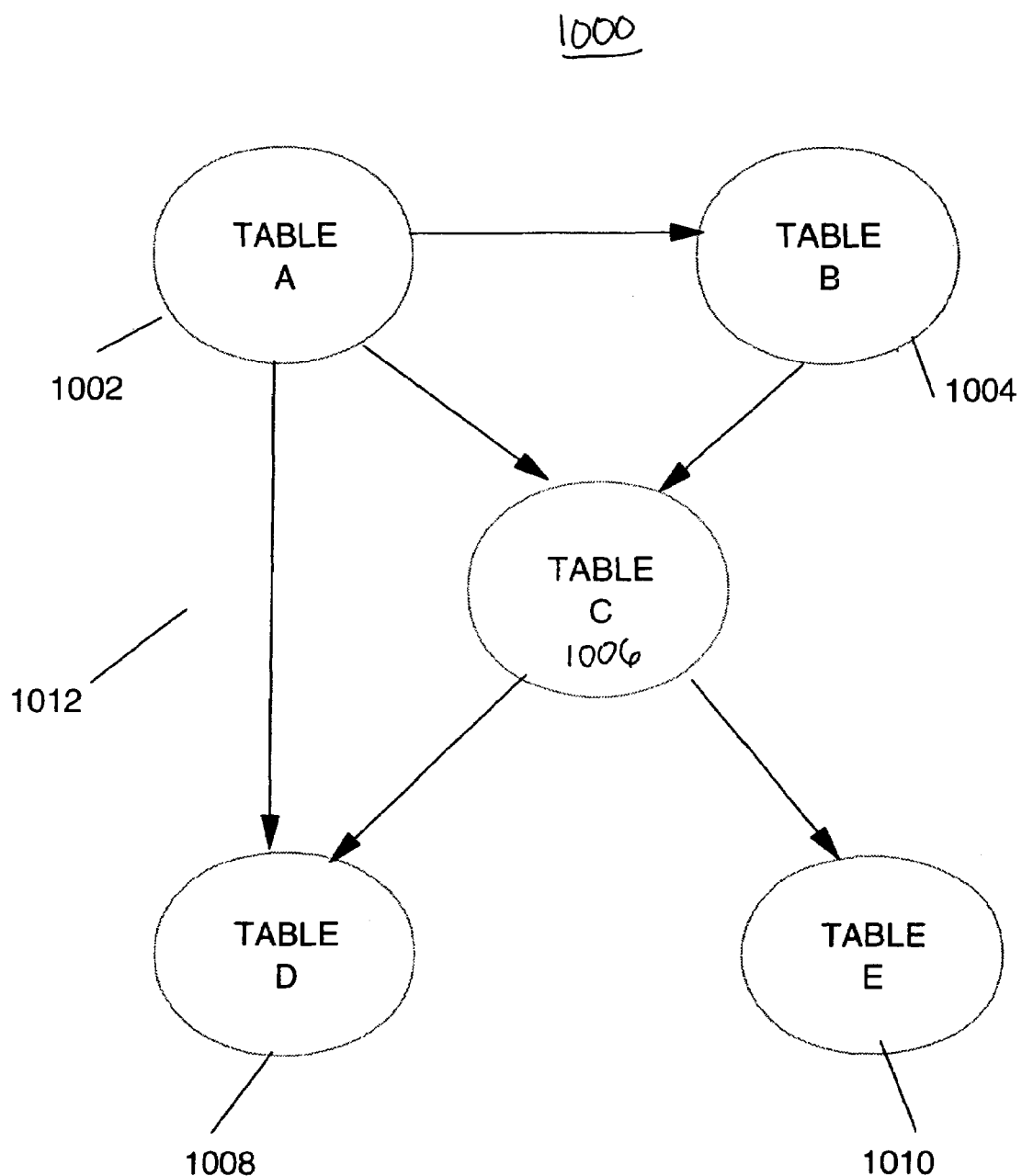
FIG. 10 is a block diagram of an exemplary association of tables in a database for an embodiment of FIG. 1.

Referring to FIG. 10, table relationship 1000 is an example of relationships amongst Table A 1002, Table B 1004, Table C 1006, Table D 1008 and Table E 1010. Tables in FIG. 10 are related by arrows, such as arrow 1012. The tail of the arrow indicates the source table in the relationship. The head of the arrow points to the table associated with the source. For Table A 1002, each of Table B 1004, Table C 1006, and Table D 1008 is associated with it, i.e. Table A 1002 can recognize a link to each of those tables. Table C 1006 is associated with Table B 1004. Tables D 1008 and E 1010 are associated with Table C 1006.

Links amongst tables can be direct or indirect. Table A 1002 recognizes a direct link to Table C 1006. Table C 1006 recognizes a direct link to Table E 1010. However, Table A 1002 can recognize a link to Table E 1010 via the link provided by Table C 1006. In database operations, links amongst tables are frequently calculated. In order to minimize traversal times amongst the tables, any traversal amongst tables should select the shortest path.

In order to determine the shortest path, attributes of tables are traversed to determine all tables involved in the query. A table graph is then created at initialization. A query framework then traverses the table graph to determine the joint predicates for these tables. Then, a composite predicate is formed with the user attribute predicates and the table joint predicates.

To determine a relationship between two tables, the tables in a database are traversed to generate a list of all direct foreign references. For each table, an inlist and an outlist is produced. This information is provided to a mapping comprising many-linked lists.

After the mapping is generated, to determine a relationship between two tables, the outgoing list from the first table is examined. From each element in the outgoing list, the mapping is traversed through its outlist until the destination table or a dead-end is reached. For each pass leading to the destination table, a variable containing the distance of hops required to get to the destination table is stored. Accordingly, the shortest path between the originating and destination tables may be selected from the path having the smallest number stored in its variable. The shortest path may be the optimum path.

Figure 11:
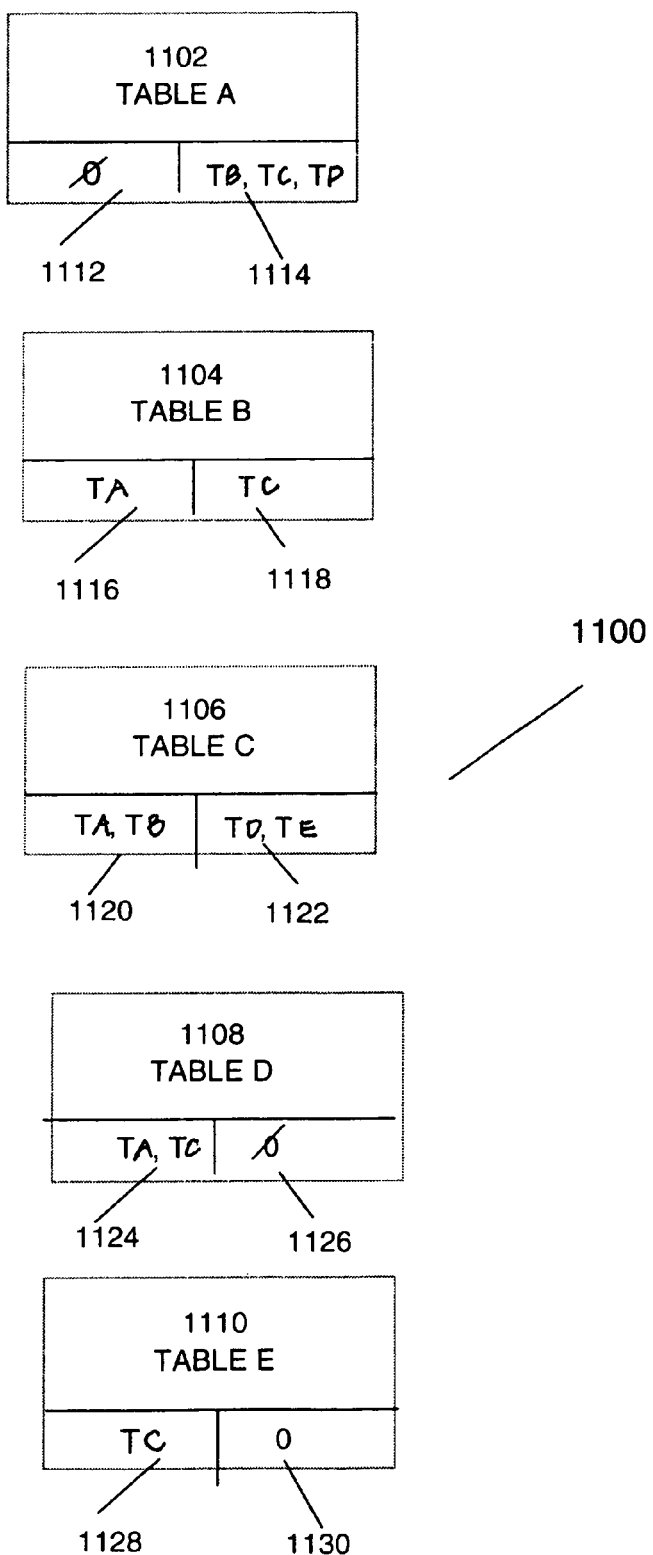
FIG. 11 is a block diagram of a data structure representing the table associations of FIG. 10.

Referring to FIG. 11, data structure 1100 representing elements of the table relationship shown in FIG. 10 is shown. Data structure 1102 represents an entry for Table A 1002; similarly, data structure 1104 represents an entry for Table B 1004; data structure 1106 represents Table C 1006; data structure 1108 represents Table D 1008; and data structure 1110 represents Table E 1010. Data structure 1102 has an infield 1112 identifying all table elements which call on table A 1002. Infield 1112 is empty as there is no table which calls on Table A 1002. Outfield 1114 identifies all tables which Table A 1002 may access. These include Table B 1004, Table C 1006 and Table D 1008, as indicated by the direction of the arrows on FIG. 10. Similarly, data structure 1102 has infield 1116 containing a reference to Table A 1002 and outfield 1118 containing Table C 1006. Similarly, Table C 1006 has infield 1120 containing references to Table A 1002 and Table B 1004. Outfield 1122 of data structure 1106 contains references to Table D 1008 and Table E 1010. Infield of data structure 1108 contains a reference to Table A 1002 and Table C 1006. Outfield 1126 of data structure 1108 is empty. Infield 1128 of data structure 1110 contains a reference to Table C 1006. Outfield 1130 is empty.

Accordingly, a linked data structure, such as a linked list, may be generated wherein starting from one data structure and traversing through all outfield data elements, a network of linkages amongst the table elements may be generated. For example, beginning with data element 1102, a link from Table A is made to Table B. Then traversing from Table B in data structure 1104, a link is made to Table C through outfield 1118. Next, a link to data structure 1106 provides a link to Table D through outfield 1122. Finally, Table D data structure 1108 ends with an outfield at outfield 1126. Accordingly, traversal reverts back up to Table A to determine if any other linkages can be made. Accordingly, a link to Table C from outfield 1114 is made. This leads to an access to Table D through outfield 1122 of Table C. Following the link through Table D leads to a null field at outfield 1126. Reverting back to Table A data structure 1102, Table D entry in outfield 1114 leads directly to the null field 1126 of data structure 1108.

The next unresolved outfield is examined. As Table B has all of its outfields resolved, for Table C data structure 1106 is examined for contents of its outfield 1122, namely table E. At Table E, data structure 1110 shows that its outfield is null in field 1130. Accordingly, the entire tree has been traversed with all elements in this manner. Next, each traversal route can be summed for its routing costs. For a system where each traversal is an equivalent cost, it can be shown that by traversing the data structures to go from Table A to Table B may be done in one step. Similarly, the cost to go from Table A to Table C is either one or two hops. The cost to go from Table A to table D is one, two or three hops. The cost to go from Table A to Table E is two hops. By tracking all costing routes, the most efficient route may be selected. It can be appreciated that other algorithms may be used to traverse the tree and other costing mechanisms may be used to weight each traversal path amongst table elements which may be implemented in other embodiments to determine an optimum path.

Figure 12:
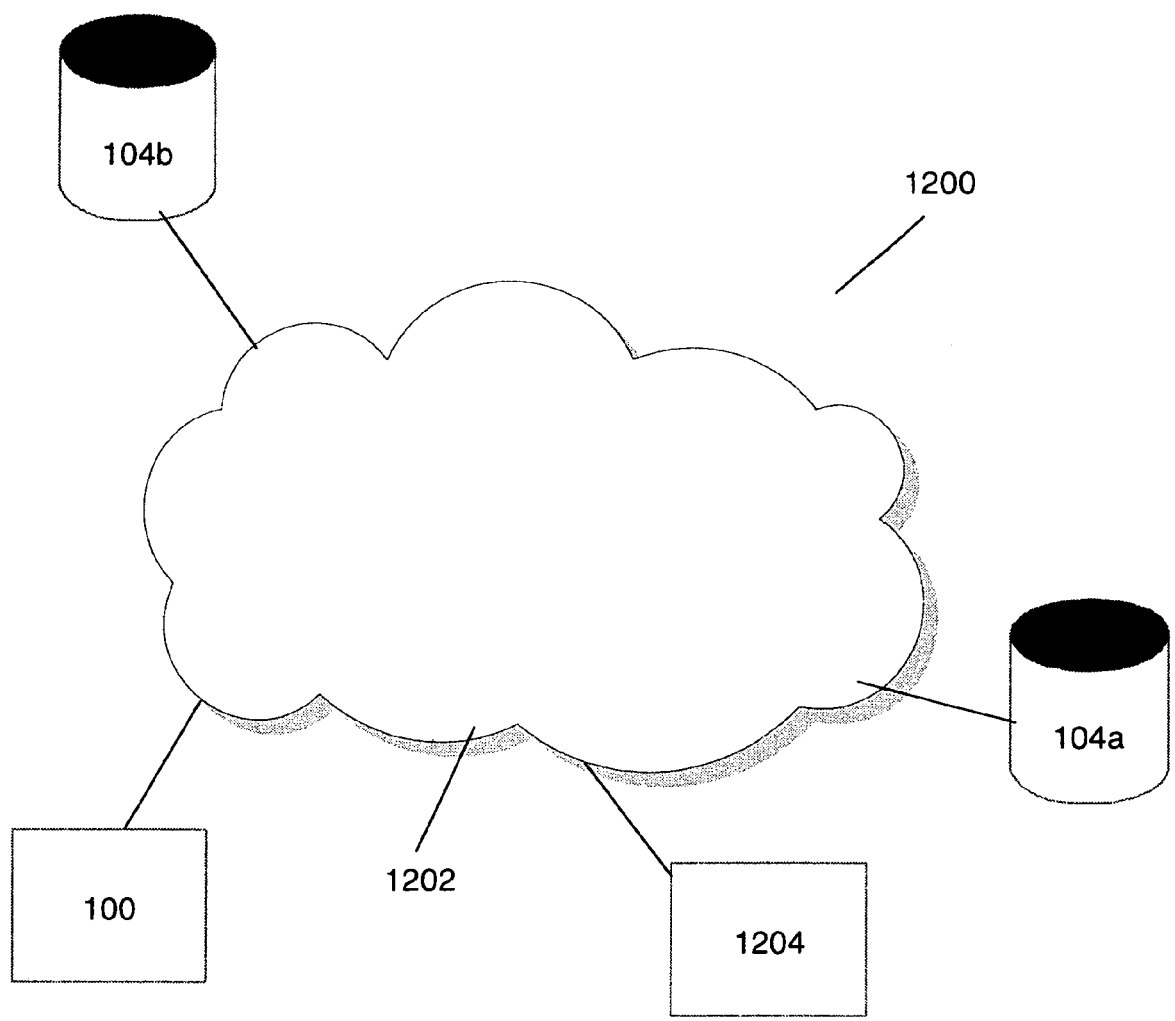
FIG. 12 is a block diagram of a distributed computer network utilizing aspects of the embodiment of FIG. 1.

Referring to FIG. 12, computer network 1200 is shown. Network 1200 comprises network system 1202, such as the Internet, which connects computer 100 to server 1204. It can be appreciated that software 102 may be provided to computer 100 via server 1204. Databases 104A and 104B are distributed along network 1202. Server 1204 and computer 100 access databases 104A and 104B through network 1202.

As far as the user on computer 100 is concerned, he does not have knowledge of the distributed nature of the information coming to computer 100 over network 1202. In the preferred embodiment, software 102 in computer 100 utilizes electronic java beans (EJB) to provide access to the system.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for evaluating traversal paths amongst a plurality of tables in a database, the database comprising at least a first table and a second table, the method comprising:
   a) for each table of the plurality of tables:
      a1) identifying all tables directly accessible by each table; and
      a2) creating a data structure comprising an entry for each table, the entry comprising an identification field for each table and a link field identifying all tables directly accessible by each table;
   b) for each entry for each table in the data structure, traversing the data structure to visit all other entries for all other tables in the data structure using contents of the link field of each entry for each table; and
   c) identifying an optimum path of the traversal paths utilizing data obtained from the traversing in step (b).

2. The method for evaluating traversal paths in claim 1, wherein the identifying step (c) further comprising the step of tracking a number of hops taken to visit all other entries for all other tables in the data structure.

3. The method for evaluating traversal paths in claim 1 wherein the data structure comprises a linked list.

4. The method for evaluating traversal paths in claim 3 wherein said data structure is traversed in a breadth first manner.

5. The method for evaluating traversal paths in claim 3 wherein said data structure is traversed in a depth first manner.

6. The method for evaluating traversal paths in claim 3 wherein said optimum path is identified utilizing said number of hops taken to visit said all other entries.

7. The method for evaluating traversal paths in claim 6 wherein for each table of the plurality of tables, the data structure further comprises a second link field identifying tables which directly access each table.

8. The method for evaluating traversal paths in claim 7, wherein a value of the optimum path is provided to an output device.

* * * * *